United States Patent
Huang et al.

(10) Patent No.: US 12,313,354 B2
(45) Date of Patent: May 27, 2025

(54) PROCESSING METHOD OF HEAT EXCHANGER AND HEAT EXCHANGER

(71) Applicant: Hangzhou Sanhua Research Institute Co., Ltd., Zhejiang (CN)

(72) Inventors: Hai Huang, Zhejiang (CN); Ming Xue, Zhejiang (CN); Jianhua Tang, Zhejiang (CN); Shurui Yu, Zhejiang (CN); Linjie Huang, Zhejiang (CN)

(73) Assignee: Hangzhou Sanhua Research Institute Co., Ltd., Hangzhou (CN)

( * ) Notice: Subject to any disclaimer, the term of this patent is extended or adjusted under 35 U.S.C. 154(b) by 162 days.

(21) Appl. No.: 17/980,470

(22) Filed: Nov. 3, 2022

(65) Prior Publication Data

US 2023/0134273 A1    May 4, 2023

(30) Foreign Application Priority Data

Nov. 4, 2021   (CN) .......................... 202111296666.2

(51) Int. Cl.
  *F28F 9/02*  (2006.01)
  *B23P 15/26* (2006.01)

(52) U.S. Cl.
  CPC ................ *F28F 9/02* (2013.01); *B23P 15/26* (2013.01)

(58) Field of Classification Search
  CPC ........ F28F 9/02; F28F 2245/02; F28F 17/005; F28F 1/126; F28F 19/04; F28F 1/28; F28F 19/02; B23P 15/26; F28D 1/05366; F28D 7/16
  See application file for complete search history.

(56) References Cited

U.S. PATENT DOCUMENTS

| | | | | |
|---|---|---|---|---|
| 4,620,590 A | * | 11/1986 | Koisuka | F28D 1/0477 165/DIG. 497 |
| 5,214,847 A | * | 6/1993 | Aoki | B21D 53/085 29/890.052 |
| 2008/0023184 A1 | * | 1/2008 | Beamer | F28F 9/0273 165/174 |

(Continued)

OTHER PUBLICATIONS

Shibuichi et al., Super Water-and Oil-Repellent Surfaces Resulting from Fractal Structure; Journal of Colloid and Interface Science; vol. 208; pp. 287-294 (Year: 1998).*

*Primary Examiner* — Lee A Holly
(74) *Attorney, Agent, or Firm* — Knobbe Martens Olson & Bear LLP

(57) ABSTRACT

A processing method of a heat exchanger and a heat exchanger are provided. The processing method includes following steps. A heat exchanger and a composite material is provided, where the heat exchanger includes a collecting pipe, a fin and a heat exchange tubes. The heat exchange tube is fixed to the collecting pipe. An inner cavity of the heat exchange tube is communicated with an inner cavity of the collecting pipe. At least part of the fin is retained between two adjacent heat exchange tubes. The composite material includes a solvent and an organosilane-based modified material with low surface energy. The composite material is coated on at least part of an outer surface of at least one of the collecting pipe, the heat exchange tube and the fin, and the composite material is cured. The heat exchanger obtained according to the present disclosure shows better hydrophobic performance.

12 Claims, 4 Drawing Sheets

(56) References Cited

U.S. PATENT DOCUMENTS

| | | | | |
|---|---|---|---|---|
| 2011/0287227 | A1* | 11/2011 | Moser | C23C 8/02 |
| | | | | 428/164 |
| 2016/0116230 | A1* | 4/2016 | Taras | F28D 1/05391 |
| | | | | 165/173 |
| 2018/0340081 | A1* | 11/2018 | Steele | B01D 53/265 |
| 2021/0348854 | A1* | 11/2021 | He | F28F 1/12 |

* cited by examiner

PROCESSING METHOD OF HEAT EXCHANGER AND HEAT EXCHANGER

CROSS-REFERENCE TO RELATED APPLICATIONS

The present application claims priority to Chinese Patent Application No. 202111296666.2, filed on Nov. 4, 2021, the content of which is incorporated herein by reference in its entirety.

TECHNICAL FIELD

The present disclosure relates to the technical field of heat exchange devices and in particular, to a processing method of a heat exchanger and a heat exchanger.

BACKGROUND

In the related art, a hydrophobic coating layer can be formed on the surface of a micro-channel heat exchanger by coating hydrophobic material prepared via sol-gel method. However, in the sol-gel method, the hydrophobic material is prepared by modifying silicon dioxide-based micro-nano particles by hydrolysate of a silane precursor. The silane precursor, such as common hexamethyldisilazane (HMDS), is prone to produce pungent smell such as ammonia gas during the modification process, and other types of silane precursor may even produce acidic corrosive substances in the reaction system. Therefore, it is easy to generate harmful substances during the heat exchanger processing, and it is difficult to ensure the environmental protection and security of the processing. Correspondingly, the heat exchanger processed to have a hydrophobic coating layer on the surface also has hidden peril in environmental protection and security. Therefore, related technologies need to be improved.

SUMMARY

The purpose of the present disclosure is to provide a processing method of a heat exchanger and a heat exchanger. The hydrophobic performance of the processed heat exchanger can be ensured. The processing of the heat exchanger and the processed heat exchanger are safer, greener and more environmentally friendly.

A first aspect of the present disclosure provides a processing method of a heat exchanger, including the following steps:
providing a heat exchanger and a composite material, where the heat exchanger includes a collecting pipe, a fin and a heat exchange tube; the heat exchange tube is fixed to the collecting pipe, and an inner cavity of the heat exchange tube is communicated with an inner cavity of the collecting pipe, at least part of the fin is retained between two adjacent heat exchange tubes, and the composite material includes a solvent and an organosilane-based modified material with low surface energy; and
arranging the composite material on at least part of an outer surface of at least one of the collecting pipe, the heat exchange tube and the fin, and curing the coating material.

According to the processing method of the heat exchanger of the present disclosure, a coating layer containing organosilane-based modified material with low surface energy can be formed at corresponding position of the heat exchanger by arranging and curing the composite material on at least part of the outer surface of at least one of the collecting pipe, the heat exchange tube and the fin. The organosilane-based modified material with low surface energy has excellent hydrophobic performance. The droplets is not prone to stay on the surface of the coating layer. Moreover, it is not easy for the organosilane-based modified material with low surface energy to hydrolyze and produce harmful substances in the system, thus making the processing of the heat exchanger greener, safer and more environmentally friendly.

A second aspect of the present disclosure provides a heat exchanger including a collecting pipe, a fin and a heat exchange tube, the heat exchange tube is fixed to the collecting pipe, an inner cavity of the heat exchange tube is communicated with an inner cavity of the collecting pipe, and at least part of the fin is retained between two adjacent heat exchange tubes;
the heat exchanger further includes a coating layer coated on at least part of an outer surface of at least one of the collecting pipe, the heat exchange tube and the fin, where the coating layer includes organosilane-based modified material with low surface energy.

The coating layer of the heat exchanger according to the present disclosure includes organosilane-based modified material with low surface energy having excellent hydrophobic performance. The droplets is not prone to stay on the surface of the coating layer. The organosilane-based modified material with low surface energy has stable properties, and is not prone to hydrolyze and produce harmful substances. Therefore, the coating layer of the heat exchanger is relatively greener, safer and more environmentally friendly while ensuring the hydrophobic performance.

DESCRIPTION OF EMBODIMENTS

Figure 1:
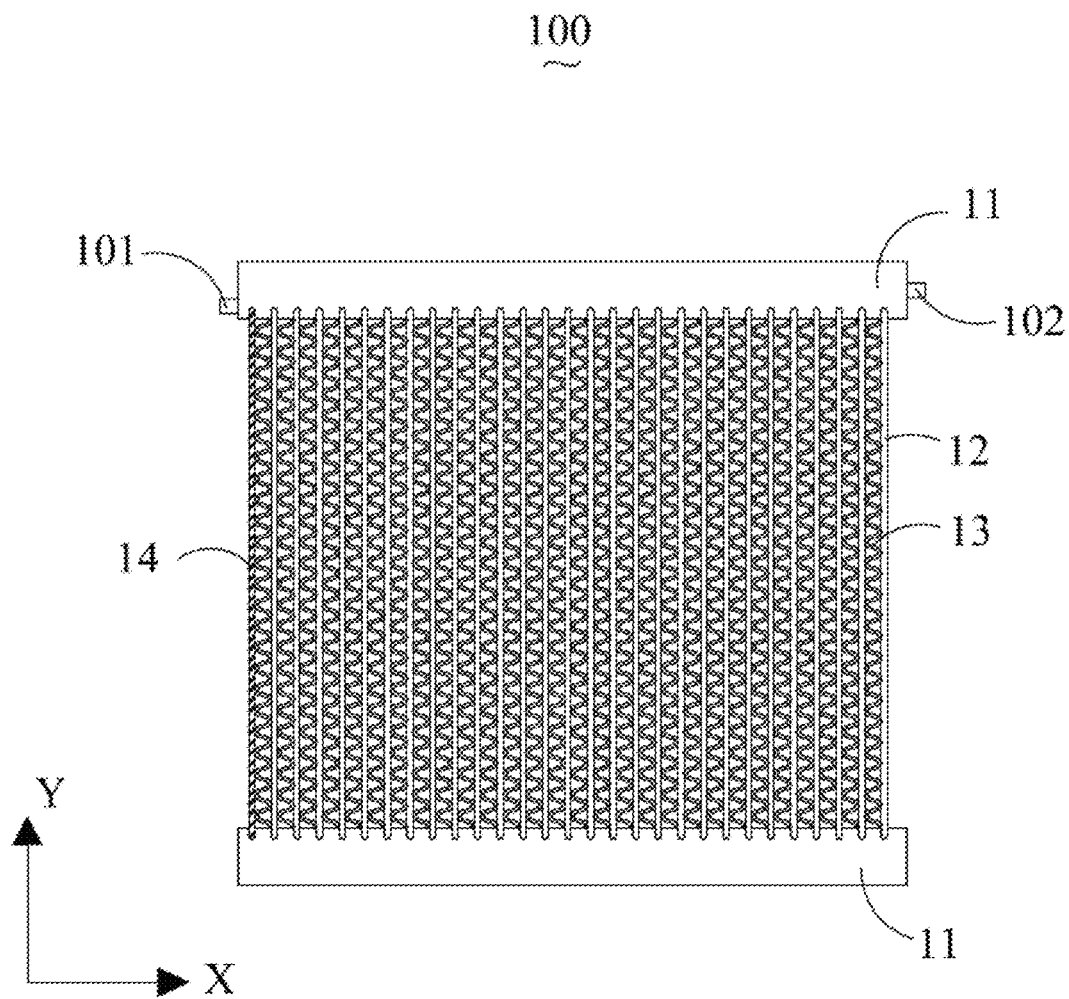
FIG. 1 is a structural schematic diagram of a heat exchanger according to an embodiment of the present disclosure.

In order to understand the technical solution of the present disclosure better, the embodiments of the present disclosure will be described in detail below with reference to the drawings.

It should be clear that the described embodiments are only parts, but not all of the embodiments of the present disclosure. Based on the embodiments of the present disclosure, all other embodiments obtained by those skilled in the art without creative efforts fall within the protection scope of the present disclosure.

The terms used in the embodiments of the present disclosure are only for the purpose of describing specific embodiments, and are not intended to limit the present disclosure. As used in the embodiments and the attached claims of the present disclosure, the terms "a/an", "said" and "the" in singular form are also intended to include plural form, unless the context clearly represents other meanings.

It should be understand that the term "and/or" used in the present disclosure is only an association relationship to describe associated objects, which represents that there may be three kinds of relationships. For example, A and/or B, which may represents the following three cases: A exists alone, A and B exist at the same time, and B exists alone. In addition, the character "/" of the present disclosure generally represents that previous and following associated objects are an "or" relationship.

In view of structural characteristics of a micro-channel heat exchanger, temperature and humidity of surface of a fin are the most important factors affecting frosting of the heat exchanger. Generally, the temperature of the surface of the fin is low and unevenly distributed, which causes uneven distribution of a frost layer, deteriorates the heat transfer of the heat exchanger, and accelerates the frosting. Further, most of the micro-channel heat exchangers adopt louvered fins having very small spacing therebetween, which easily causes "bridging" phenomenon between condensed droplets, and reduces the drainage performance. The condensed water is accumulated at sharp corners of the fins, and is difficult to be removed. When the frosting occurs again, the condensed water freezes, resulting in the phenomenon of the frosting aggravation after the second frosting period.

In some technologies, a hydrophobization treatment is carried out on a heat exchanger surface. For example, a hydrophobic coating material is coated on the surface of the heat exchanger to form a hydrophobic coating layer. The hydrophobic surface of the hydrophobic coating layer can increase a contact angle between the droplets formed in early frosting stage and the wall of the heat exchanger, and reduce contact area thereof, thereby making the droplets freeze slowly, which correspondingly delays formation of initial frost crystals. However, most of the hydrophobic coating materials used in the related art are modified silicon dioxide-based sol prepared by the sol-gel method. As for raw materials for preparing the sol, hexamethyldisilazane or the like is often used as the silane precursor. However, hexamethyldisilazane is prone to produce pungent smell during the reaction process of the system. The pungent smell troubles the person that manufactures the heat exchanger, and does not meet the requirements for the green and environmental protective coating layer. Therefore, delaying frosting of the heat exchanger and avoiding pungent smell or hazardous chemical materials during the production process and by the final products have become problems to be urgently solved for the relevant industry.

Based on this, the technical solutions of the embodiments of the present disclosure provide a heat exchanger and a processing method of a heat exchanger. For the processing method of the heat exchanger, the present disclosure also provides a preparation method of a composite material for forming a coating layer. The coating layer of the heat exchanger according to the technical solutions of the embodiments of the present disclosure has good frosting resistance performance. While ensuring the hydrophobic performance, the coating layer is relatively green and environmentally friendly. No pungent smell or hazardous chemicals are generated during the preparing of the coating layer, and thus providing a better user experience. The specific technical solutions are described below.

In the present disclosure, percentage, proportion or parts referred are counted by mass unless stated otherwise. The term "part by mass" refers to a basic measurement unit of mass ratio relationship of multiple components, and 1 part by mass may represent any unit mass, for example, 1 g, 1.68 g, or 5 g.

As shown in FIG. 1, the heat exchanger 100 includes two collecting pipes 11, a plurality of heat exchange tubes 12 and a plurality of fins 13. In the heat exchanger 100, the plurality of heat exchange tubes 12 are all fixed to the collecting pipe 11. Multiple channels for flowing refrigerant are provided at the heat exchanger tube 12, and the multiple channels at the heat exchanger tube 12 are all communicated with an inner cavity of the collecting pipe 11. At least part of the fin 13 is located between two adjacent heat exchange tubes 12. The collecting pipe 11 is provided with a fluid inlet 101 and a fluid outlet 102 which are communicated with the inner cavity thereof, so as to facilitate fluid to enter the heat exchanger.

Figure 2:
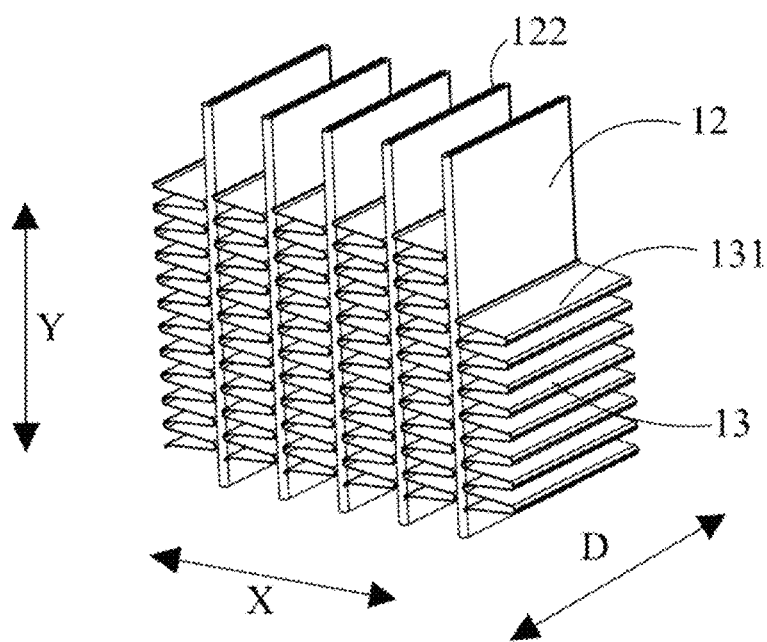
FIG. 2 is a perspective schematic diagram of a heat exchange tube and a fin of a heat exchanger according to an embodiment of the present disclosure.

The plurality of heat exchange tubes 12 are arranged along a length direction of the collecting pipe 11, and the length direction of the collecting pipe 11 may refer to X direction in FIG. 1. The heat exchange tube 12 has a tubular structure extending longitudinally. A length direction of the heat exchange tube 12 may refer to Y direction in FIG. 1, and a width direction of the heat exchange tube 12 may refer to D direction in FIG. 2. The dimension in the width direction of the heat exchange tube 12 is greater than that in a thickness direction thereof, and the thickness direction of the heat exchange tube 12 substantially coincides with the length direction of the collecting pipe 11. In addition, the width direction of the heat exchange tube 12 and the length direction of the collecting pipes 11 are not co-directional. In FIG. 2, the width direction (the D direction) of the heat exchange tube 12 is substantially perpendicular to the length direction (the X direction) of the collecting pipe 11.

As shown in FIG. 1, and both ends of the heat exchange tubes 12 in the length direction are inserted into the inner cavities of the two collecting pipes 11, respectively. The type of the heat exchanger is often referred to as a single row heat exchanger in the industry. In some other embodiments, the number of the collecting pipes 11 may be one or more than two. Correspondingly, the number of the heat exchange tubes and the fins may also be set according to the actual product requirements.

In some embodiments, referring to FIG. 2, the fin 13 has a waveform structure extending along the length direction (the Y direction) of the heat exchange tube 12. The fin 13 includes a plurality of fin units 131 arranged along the length direction of the heat exchange tube 12, and the plurality of fin units 131 are sequentially connected to each other along the length direction of the heat exchange tube 12. A wave crest or a wave trough in the waveform structure corresponding to the fin 13 is formed, and the fin 13 is fixed to the heat exchange tube 12 at a location where two adjacent fin units 131 are connected to each other. During assembly, the collecting pipe 11, the fin 13, the heat exchange tube 12 and other components can be assembled together in advance, the collecting pipe 11 and the heat exchange tube 12 are fixed by brazing, and the fins 13 are retained between two adjacent heat exchange tubes 12.

The heat exchanger 100 further includes a coating layer 14 coated on at least part of an outer surface of at least one of the collecting pipe 11, the heat exchange tube 12 and the fin 13. FIG. 1 illustrates the coating layer 14 by a shaded portion on the surface of the leftmost heat exchange tube 12 of the plurality of heat exchange tubes 12.

In the embodiments of the present disclosure, the coating layer 14 includes an organosilane-based modified material with low surface energy. In the related art, state of liquid on a solid surface is as follows: if a contact angle between a droplet and the solid surface is large, the wettability of the liquid is poor and the lyophobicity of the solid surface is strong, otherwise, the lyophily of the solid surface is strong. The hydrophobicity of the solid surface is closely related to the surface energy thereof. The surface energy of the solid is low, a static water contact angle is large, and when the water contact angle is greater than 90°, the hydrophobicity is significant. The leaf surface of many plants in nature is superhydrophobic, the most typical example of which is lotus leaf and the corresponding Lotus-effect. Although some research articles points out that the modified material with low surface energy may be hydrophobic, no technical solution is adopted in the prior art. It is difficult for droplets to stay on the surface of the coating layer, and it is not easy for the organosilane-based modified material with low surface energy to hydrolyze and produce harmful substances in the system, thus the heat exchanger processing is safer. The core components used for the coating layer of the heat exchanger can solve the problem that the coating layers in the prior art are prone to produce pungent smell and harmful substances. Correspondingly, no technical solution in the prior art that utilizes the organosilane-based modified material with low surface energy to delay frosting of the heat exchanger.

The organosilane-based modified material with low surface energy in the embodiments of the present disclosure includes one or more of 1H,1H,2H,2H-perfluorodecyltriethoxysilane with a molecular formula of $C_{16}H_{19}F_{17}O_3Si$, 1H,1H,2H,2H-perfluorodecyltrimethoxysilane with a molecular formula of $C_{13}H_{13}F_{17}O_3Si$, 1H,1H,2H,2H-perfluorooctyltriethoxysilane with a molecular formula of $C_{14}H_{19}F_{13}O_3Si$, octadecyltrimethoxysilane with a molecular formula of $C_{21}H_{46}O_3Si$, and hexadecyltrimethoxysilane with a molecular formula of $C_{19}H_{42}O_3Si$.

In order to further improve the compactness and hydrophobicity of the coating layer 14 according to the embodiments of the present disclosure, the coating layer 14 may further includes a hydrophobic filler of nanoparticle type, which may be hydrophobic nanoparticles. In some embodiments, the hydrophobic filler includes hydrophobic gaseous silicon dioxide. The nano-silicon dioxide-based hydrophobic filler can be combined with the organosilane-based modified material with low surface energy to form a dense network structure. Both the modified material with low surface energy and the hydrophobic filler are hydrophobic, and the combination of the two can further control a static contact angle between the coating layer 14 and water to be greater than or equal to 150°, which can be called a superhydrophobic state. In some embodiments of the present disclosure, the static contact angle between the coating layer 14 and water is greater than 150°, and a droplet rolling angle of the coating layer 14 is less than 5°.

Figure 3:
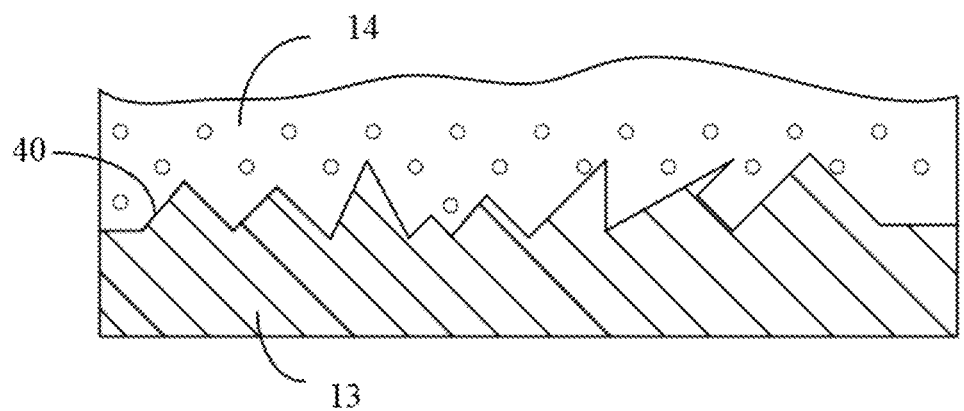
FIG. 3 is a schematic diagram of a combination of a coating layer and a metal substrate corresponding to a fin according to an embodiment of the present disclosure.

Referring to FIG. 3, in some embodiments, the material of a metal substrate corresponding to any one of the collecting pipe 11, the fin 13 and the heat exchange tube 12 includes at least one of aluminum, cooper and stainless steel. Taking the fin 13 in FIG. 3 as an example, in the embodiments of the present disclosure, the collecting pipe 11, the fin 13 and the heat exchange tube 12 are all aluminous components. In an embodiment, an outer surface of the metal substrate corresponding to the fin 13 includes an uneven rough surface 40 with a roughness of 0.5 μm~10 μm, where the roughness is defined as Ra in the present disclosure. In some embodiments, the roughness Ra of the rough surface 40 of the above metal substrate is 1 μm~3 μm. In some embodiments, the roughness of the rough surface 40 of the above metal substrate may specifically be 1 μm, 1.2 μm, 1.4 μm, 1.6 μm, 1.8 μm, 2.0 μm, 2.2 μm, 2.4 μm, 2.6 μm, 2.8 μm, 3 μm, etc., but the roughness is not limited to the listed values, and other values not listed in the numerical range are also applicable.

The rough surface 40 of the metal substrate of each above component can be obtained by sandblasting the heat exchanger 100. Note that the sandblasting process for the heat exchanger 100 in the present disclosure is performed on the basis that components of the heat exchanger are assembled and fixed. Controlling the roughness of the surface of the metal substrate can improve the durability of coating layers subsequently combined therewith. Although a greater roughness is favorable for the adhesion of subsequent coating layers, if the roughness is too great, for example, greater than 10 μm, the deformation of the metal substrate will be relatively large, which thereby requires relatively large thickness of the metal substrate. Otherwise, the metal substrate is prone to be damaged. If the roughness is too small, the improvement of the durability of the coating layer will be less obvious. In an embodiment, at least part of the coating layer 14 is coated on the rough surface 40.

The embodiments of the present disclosure further provide a heat exchanger processing method, including the following steps:

providing a composite material and a heat exchanger, where the composite material provided includes a solvent and a organosilane-based modified material with low surface energy, the heat exchanger provided includes a collecting pipe, a fin and a heat exchange tube, the heat exchange tube is fixed to the collecting pipe, and an inner cavity of the heat exchange tube is communicated with an inner cavity of the collecting pipe, and at least part of the fin is retained between two adjacent heat exchange tubes; and coating the composite material on at least part of a surface of at least one of the collecting pipe, the heat exchange tube and the fin, curing the composite material, and finally, obtaining a heat exchanger with a coating layer.

Figure 4:
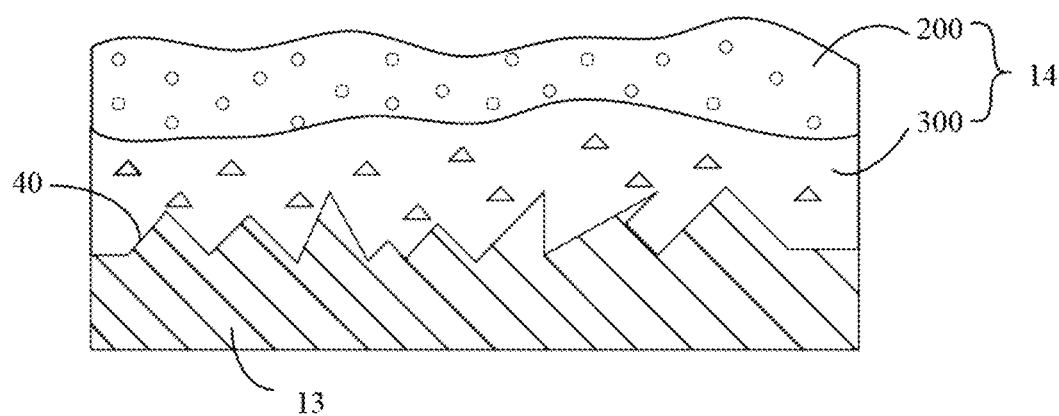
FIG. 4 is a flowchart of a heat exchanger processing method according to an embodiment of the present disclosure.

As shown in FIG. 4, the above heat exchanger with the coating layer can be obtained by the following steps:

Step S11, providing a heat exchanger, where the heat exchanger includes a collecting pipe, a fin and a heat exchange tube, the collecting pipe and the heat exchange tube are fixed with each other, and the fin is retained between two adjacent heat exchange tubes;

Step S21, sandblasting the heat exchanger, the sandblasted heat exchanger satisfies that an uneven rough surface is formed on at least part of an outer surface of a metal substrate corresponding to at least one of the collecting pipe, the fin and the heat exchange tube;

Step S31, cleaning and drying the sandblasted heat exchanger; and

Step S41, providing a composite material, and dip-coating the dried heat exchanger with the composite material, to obtain the heat exchanger with a coating layer.

The collecting pipe, the fin and the heat exchange tube may be welded by brazing. That is, these components are welded into a whole by brazing. The brazing process is favorable to achieve sealability of positions where the above components are connected. However, a brazing flux will be left on the outer surface of the metal substrate of the collecting pipe, the fin and the heat exchange tube during the brazing process. As being limited by its own material properties, the brazing flux including an inorganic material has poor adhesion, and is difficult to combine with the coating material. In practical application, the brazing flux as such is easy to desquamate from the heat exchanger, so that the coating layer at the location where the brazing flux remains is difficult to be maintained for a long time. In addition, since the metal substrate of each component of the heat exchanger is exposed to the air for a long time, an oxide layer will be formed, which is also unfavorable to combine with some types of coating materials. Therefore, the surface of the heat exchanger needs to be treated before coating, to remove the residual brazing flux, oxide, oil stain and other contaminants on the surface, and to contrast a certain rough surface structure for adhering the coating layer.

In step S21, said sandblasting the heat exchanger specifically includes the following steps: sandblasting the surface of the heat exchanger 1~3 times by abrasives with particle size between 100 meshes and 280 meshes. The abrasives are gravels made of corundum material. In some embodiments, the particle size of abrasives is 100~180 meshes, such as 150 meshes. When sandblasting the heat exchanger, the number of times of sandblasting for the fins is less than or equal to 3, for the reason that the fins are relatively thin, and excessive sandblasting may deform or damage the fins. Therefore, during the sandblasting process, it is enough to sandblast the fins only once.

The advantages of the sandblasting in the above step S21 are as follows. In the first aspect, a large amount of residual brazing flux, oxide layer, oil stain, or the like on the surface of the metal substrate can be removed, to obtain a relatively clean surface of the metal substrate. In the second aspect, a better micro-rough surface structure on the surface of the metal substrate is formed by the sandblasting and polishing of the abrasive, which increases the subsequent bonding force with other coating materials, and facilitates the leveling and decoration of the coating material. In the third aspect, cutting and impact produced by the sandblasting strengthen the mechanical properties of the surface of the metal substrate, and improve the fatigue resistance of the metal substrate. In the fourth aspect, the sandblasting can remove irregular structures such as burrs on the surface of the metal substrate, and create very small sounded corners on the surface of the metal substrate, especially on the junction where the various components are connected, so that the surface of the metal substrate is more flat and beautiful, which is favorable for subsequent processing. The surface structure and morphology of the metal substrate has been changed after sandblasting, and metal grains are finer and denser. More hydroxyl groups are formed on the surface of the metal substrate after sandblasting. During the process of connecting with the coating layer, the coating and the metal substrate can be connected by covalent bonds through dehydration condensation between the hydroxyl groups of the coating layer and the hydroxyl groups of the metal substrate. The connection mode of covalent bonds is relatively stable, which is favorable to improve the durability of the connection between the metal substrate and the coating layer.

In other embodiments, the surface of the heat exchanger can also be constructed with a certain roughness through chemical processing, such as acid washing or alkali washing, and the excess adhesion on the surface of the metal substrate can be removed by chemical reaction between a solvent, such as acid and alkali as cleaning agent, and metal oxides, brazing fluxes, etc. However, the cost of the method is high, the process is relatively complicated, and there are certain risks in the cleaning process.

In step S31, said cleaning and drying the sandblasted heat exchanger includes the following steps: ultrasonically cleaning the sandblasted heat exchanger with at least one of deionized water, ethanol and absolute ethanol, with a duration of the ultrasonic cleaning is 5 min~10 min, and an ultrasonic frequency of the ultrasonic cleaning is 80 Hz~100 Hz, and then, drying the heat exchanger by fan drying, natural drying or baking drying.

Note that the composite material in step S41 is not equivalent to the coating layer. After the composite material is coated on at least part of the surface of at least one of the collecting pipe, the heat exchange tube and the fin, the whole structure needs to be cured at a high temperature. During the high-temperature curing process, the aqueous solvent in the composite material will volatilize, and the material with low surface energy such as 1H,1H,2H,2H-perfluorodecyltriethoxysilane or 1H,1H,2H,2H-perfluorodecyltrimethoxysilane forms a film layer on the aluminum surface of the heat exchanger. The heat exchanger product with a coating layer can be finally obtained after curing. In the embodiments of the present disclosure, the way to coat the heat exchanger with the composite material includes, but is not limited to at least one of dip-coating, spray coating, brush coating, flow coating or roller coating. Considering the convenience of implementation, the composite material according to the embodiments of the present disclosure can be coated on the surface of the heat exchanger by dip-coating or spray coating. The duration of dip-coating is greater than or equal to 30 s, and further optionally, 2~3 min. The number of times of dip-coating is 1~5, and further optionally 1. After the dip-coating is completed, the duration of the high-temperature curing is 5 min-30 min. The curing temperature is 110° C.~130° C., and further optionally 120° C.

In some embodiments of the present disclosure, prior to the step S41 (i.e., said providing the composite material), a step of preparing the composite material is also included, and said preparing the composite material includes the following steps: based on part by mass, mixing 90~95 parts by mass of a solvent and 0.5~10 parts by mass of an organosilane-based modified material with low surface energy. The solvent includes one or more of ethanol, methanol and isopropanol. The solvent may be 90 parts by mass, 92 parts by mass, 94 parts by mass, 96 parts by mass, 98 parts by mass, 98.5 parts by mass, 99 parts by mass and 99.5 parts by mass, etc., but it is not limited to the listed values, and other values not listed in the numerical range are also applicable. The organosilane-based modified material with low surface energy may be 0.5 part by mass, 1 part by mass, 3 parts by mass, 5 parts by mass, 7 parts by mass, 8.5 parts by mass, 9 parts by mass, 10 parts by mass, etc., but it is not limited to the listed values, and other values not listed in the numerical range are also applicable.

In some other embodiments of the present disclosure, prior to the step S41 (i.e., said providing the composite material), a step of preparing the composite material is also included, and said preparing the composite material includes the following steps: based on part by mass, mixing 86~99.4 parts by mass of the solvent, 0.5~10 parts by mass of the organosilane-based modified material with low surface energy and 0.1~4 parts by mass of the hydrophobic filler of nanoparticle type. The hydrophobic filler includes hydrophobic gaseous silicon dioxide. The solvent may be 86 parts by mass, 88 parts by mass, 90 parts by mass, 92 parts by mass, 94 parts by mass, 96 parts by mass, 98 parts by mass, 98.5 parts by mass, 99 parts by mass and 99.4 parts by mass, etc. The organosilane-based modified material with low surface energy may be 0.1 part by mass, 1 part by mass, 3 parts by mass, 5 parts by mass, 7 parts by mass, 8.5 parts by mass, 9 parts by mass, 10 parts by mass, etc. The hydrophobic filler may be 0.1 part by mass, 0.5 part by mass, 1 part by mass, 1.5 parts by mass, 3 parts by mass, 4 parts by mass, etc. It is not limited to the listed values, and other values not listed in the numerical range are also applicable.

For example, said preparing the composite material according to the present disclosure includes the following steps: based on part by mass, mixing 98 parts by mass of ethanol, 1 part by mass of 1H,1H,2H,2H-perfluorodecyltrimethoxysilane and 1 part by mass of hydrophobic fumed nano silicon dioxide. The mixing method may include ultrasonic mixing of 15 min followed by mechanically stirring of 2 h, to obtain the composite material.

In other embodiments of the present disclosure, the composite material according to the present disclosure can also be applied to non-heat exchanger products, such as heat pump water heaters. The composite material according to the embodiments of the present disclosure can be applied to other products that need to improve hydrophobic performance and/or hydrophobic durability.

Figure 5:
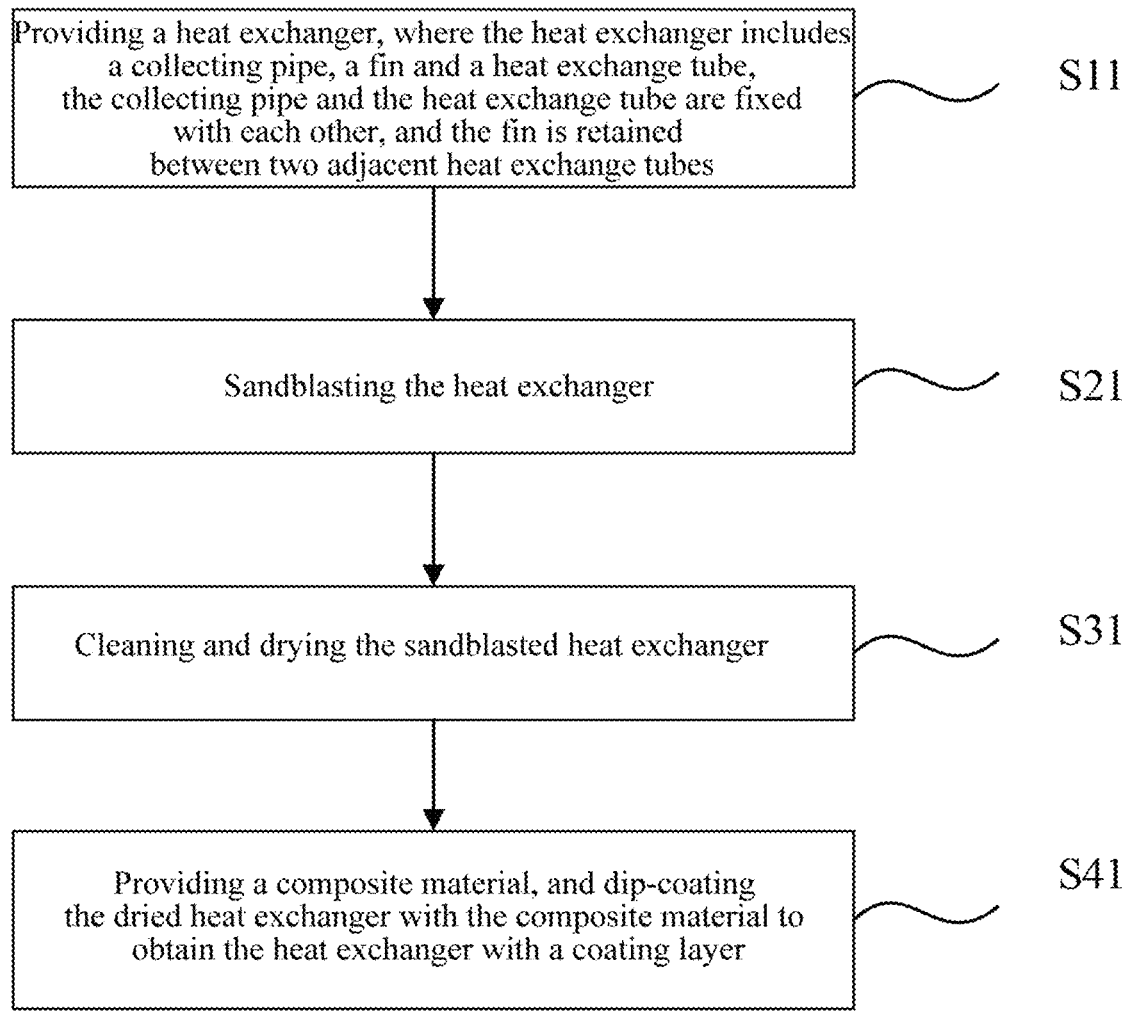
FIG. 5 is a schematic diagram of a combination of a coating layer and a metal substrate corresponding to a fin according to another embodiment of the present disclosure.

The coating layer 14 of the heat exchanger 100 of the present disclosure may be a single-layer coating layer or a double-layer coating layer, or further, may be a multi-layer coating with more layers. Referring to FIG. 5, in some embodiments of the present disclosure, the coating layer 14 includes a top coating layer 200 and a bottom coating layer 300. At least part of the bottom coating layer 300 is in contact with the rough surface 40, and at least part of the top coating layer 200 is coated on the surface of the bottom coating layer 300. The bottom coating layer 300 includes a compound containing rare earth elements. The organosilane-based modified material with low surface energy is located at the top coating layer 200.

In the preparation process, firstly, the rare earth conversion processing can be performed on the heat exchanger to form a rare earth conversion coating layer, and then, the hydrophobic film surface processing can be performed on the heat exchanger. The hydrophobic top coating layer 200, the bottom coating layer 300 formed after the rare earth conversion processing and the sandblasted heat exchanger 100 are tightly combined. The bottom coating layer formed after the rare earth conversion processing can further improve the compactness of the entire coating layer 14, and can block cathodic reduction reaction when a local pitting occurs, so that the corrosion resistance of the heat exchanger is improved. Moreover, due to the good corrosion resistance brought by the bottom coating layer 300 to the surface of the heat exchanger, the surface of the metal substrate of the heat exchanger is not prone to produce too much locally raised metal corrosion oxides, which correspondingly reduces destruction on the top coating layer 200, and thus, the bottom coating layer 300 is conducive to maintaining the durability of the top coating layer 200 in return. The top coating layer 200 can effectively reduce adhesion and enrichment of corrosive solution through the good hydrophobicity thereof, avoiding deficiencies in brittleness and hardness of the existing chromate passive film, reducing penetration of corrosion medium into the metal substrate, and thereby further improves the corrosion resistance of the heat exchanger, and effectively prolongs the frosting duration on the surface of the heat exchanger. Therefore, through cooperation of the top coating layer 200 and the bottom coating layer 300, not only the corrosion resistance of the heat exchanger is improved, which is conducive to prolonging service life of the heat exchanger, but also the hydrophobic property is generated on the surface of the heat exchanger, which can delay the frosting. Furthermore, when the heat exchanger is used in an air-conditioning system or a heat pump system, it is conducive to prolonging the service life, and improving the heat exchange efficiency of the heat exchanger.

The specific types of the compound containing rare earth elements in the bottom coating layer 300 may be various provided that the needs of improving the corrosion resistance of the heat exchanger is satisfied. In some embodiments, the rare earth elements contained in the compound include lanthanide rare earth elements, and the lanthanide rare earth elements include at least one of lanthanum, cerium, praseodymium, neodymium, promethium, samarium and europium. For example, the compound containing rare earth elements may be a lanthanum-containing compound, a cerium-containing compound, a praseodymium-containing compound, a neodymium-containing compound, a promethium-containing compound, a samarium-containing compound, a europium-containing compound, or a mixture of any two or more of the above compounds in any ratio.

In some embodiments, the above rare earth elements may be cerium, and the compound containing rare earth elements may be the cerium-containing compound. In some embodiments, the compound containing rare earth elements includes cerium oxides (such as ceria, i.e., $CeO_2$) and cerium hydroxides (such as cerium hydroxide, i.e., $Ce(OH)_4$). Regarding the universality of sources, the availability or the cost, the cerium-containing compound is selected as the compound containing rare earth elements, and the cerium-containing compound is in a state where $CeO_2$ and cerium hydroxide $Ce(OH)_4$ coexist. In this way, the chemical properties are stable, which is conducive to increasing pitting resistance effect, and improving the corrosion resistance of the heat exchanger.

In some embodiments, weight per unit area of the bottom coating layer 300 is controlled at 0.75 $g/m^2$~1.2 $g/m^2$. In some embodiments, weight per unit area of the top coating layer 200 is 0.1 $g/m^2$~1 $g/m^2$. Appropriate thickness of the bottom coating layer 300 (the rare earth conversion coating layer) and the top coating layer 200 (the hydrophobic coating) can effectively improve the corrosion resistance of the heat exchanger, and delay the frosting, without causing too much negative impact on the heat exchanging efficiency of the heat exchanger.

To facilitate the understanding of the present disclosure, multiple sets of experimental verification have been carried out. The present disclosure will be further described below with reference to specific examples and comparative examples. Moreover, in order to facilitate the performance test, an aluminum plate is used for the test instead of the heat exchanger. That is, the aluminum plate of the same material as the heat exchanger is used here, and the relevant coating material is coated on the aluminum plate to form a coating layer for testing.

Example 1

(1) Pretreatment of a plate: the plate was sandblasted by white corundum with 150 meshes, the spray gun perpendicularly sprayed at an angle of about 90° between the spray gun and the position to be coated. The distance between the spray gun and the position to be coated was 50 mm, and the plate was sandblasted once. Then, the plate was cleaned by spraying absolute ethanol and dried at 40° C. for standby.

(2) Preparation of a composite material: based on part by mass, 99 parts by mass of ethanol and 1 part by mass of 1H,1H,2H,2H-perfluorodecyltrimethoxysilane was ultrasonically mixed for 15 min, and mechanically stirred for 2 h, to obtain the composite material.

(3) Preparation of a coating layer on the plate: the plate treated in step (1) was entirely immersed into the composite material prepared in step (2), and the duration of dip-coating was 30 min. After dip-coating once, the plate was put in an oven and cured at 120° C. for 20 min, to obtain the plate with the coating layer.

Example 2

Example 2 differed from Example 1 in that the duration of dip-coating in step (3).

Preparation of a coating layer on the plate in step (3) in Example 2: the plate treated in step (1) was entirely immersed into the composite material prepared in step (2), and the duration of dip-coating was 2 min. After dip-coating once, the plate was put in the oven and cured at 120° C. for 20 min, to obtain the plate with the coating layer.

The rest were the same as those in Example 1.

Example 3

Example 3 differed from Example 1 in that a hydrophobic filler was added to the formula of the composite material in step (2) of Example 3.

Preparation of a composite material in step (2) in Example 3: based on part by mass, 98 parts by mass of ethanol, 1 part by mass of 1H,1H,2H,2H-perfluorodecyltrimethoxysilane and 1 part by mass hydrophobic gaseous silicon dioxide were ultrasonically mixed for 15 min, and mechanically stirred for 2 h, to obtain the composite material.

The rest were the same as those in Example 1.

Example 4

Example 4 differed from Example 1 in that the hydrophobic filler was added to the formula of the composite material in step (2) of Example 4, and the duration of dip-coating in step (3) of Example 4 was different from that of Example 1.

Preparation of a composite material in step (2) in Example 4: based on part by mass, 99 parts by mass of ethanol and 1 part by mass 1H,1H,2H,2H-perfluorodecyltrimethoxysilane were ultrasonically mixed for 15 min, and mechanically stirred for 2 h, to obtain the composite material.

Preparation of a coating layer on the plate in step (3) in Example 4: the plate treated in step (1) was entirely immersed into the composite material prepared in step (2), and the duration of dip-coating was 2 min. After dip-coating once, the plate was put in the oven and cured at 120° C. for 20 min, to obtain the plate with the coating layer.

The rest were the same as those in Example 1.

Example 5

Example 5 differed from Example 3 in the type of the organosilane-based modified material with low surface energy in the formulation of the composite material in step (2).

Preparation of a composite material in step (2) in Example 5: 98 parts by mass of ethanol, 1 part by mass 1H,1H,2H,2H-perfluorodecyltriethoxysilane and 1 part by mass of hydrophobic gaseous silicon dioxide were ultrasonically mixed for 15 min, and mechanically stirred for 2 h, to obtain the composite material.

The rest were the same as those in Example 3.

Example 6

Example 6 differed from Example 3 in the type of the organosilane-based modified material with low surface energy in the formulation of the composite material in step (2).

Preparation of a composite material in step (2) in Example 6: based on part by mass, 98 parts by mass of ethanol, 1 part by mass of 1H,1H,2H,2H-perfluorodecyltrimethoxysilane and 1 part by mass of hydrophobic gaseous silicon dioxide were ultrasonically mixed for 15 min, and mechanically stirred for 2 h, to obtain the composite material.

Example 7

Example 7, where said pretreating the plate by sandblasting was not performed, specifically included the following steps.

(1) Preparation of a composite material: based on part by mass, 98 parts by mass of ethanol, 1 part by mass of 1H,1H,2H,2H-perfluorodecyltrimethoxysilane and 1 part by mass of hydrophobic gaseous silicon dioxide were ultrasonically mixed for 15 min, and mechanically stirred for 2 h, to obtain the composite material.

(2) Preparation of a coating layer on the plate: the plate was entirely immersed into the composite material prepared in step (1), and the duration of dip-coating was 30 min. After dip-coating once, the plate was put in the oven and cured at 120° C. for 20 min, to obtain the plate with the coating layer.

Example 8

1. Preparation of a Coating Material (a) Preparation of a rare earth conversion coating material: based on part by mass, 1 part by mass of cerium (III) nitrate hexahydrate was added into 95.1 parts by mass of deionized water, and was mechanically stirred until solid was completely dissolved, to obtain a colorless and transparent solution; the solution was heated to 50° C. with a water bath, then 2.4 parts by mass of n-butanol solution of tert-Butyl hydroperoxide (content ≥70%) was added into the solution, and the solution was stirred and heated to 50° C., to obtain the rare earth conversion coating material.

(b) Preparation of hydrophobic coating material: based on part by mass, 98 parts by mass of ethanol, 1 part by mass of 1H,1H,2H,2H-perfluorodecyltrimethoxysilane and 1 part by mass of hydrophobic gaseous silicon dioxide were ultrasonically mixed for 15 min, and mechanically stirred for 2 h, to obtain the hydrophobic coating material.

2. Treatment of a Plate (c) The plate was sandblasted by white corundum with 120 meshes, the spray gun perpendicularly sprayed at an angle of 45° between the spray gun and the position to be coated. The distance between the spray gun and the position to be coated was 50 mm, and the plate was sandblasted once. Then, the plate was cleaned by spraying absolute ethanol and dried at 40° C. for standby.

(d) The plate treated in step (c) was entirely immersed into the rare earth conversion coating material obtained in step (a). After standing at 50° C. for 40 min, the plate was taken out and dried by blowing cold air to obtain the plate with the bottom coating.

(e) The plate treated in step (d) was entirely immersed into the hydrophobic coating material obtained in step (b), and dip-coated for 3 times, and the duration of each time of dip-coating was 2 min. After each time of dip-coating, the plate was dried by blowing with cold air. After dip-coating, the plate was cured at 140° C. for 1 h, to obtain a plate having double coating layer including a bottom coating layer and a top coating.

Comparative Example 1

Comparative Example 1 differed from Example 1 in the preparation of the composite material: based on part by mass, 28 parts by mass of hexamethyldisilazane (HMDS), 71 parts by mass of ethanol and 1 part by mass of hydrophilic silicon dioxide were mixed, and then mechanically stirred for reaction in a 35° C. water bath for 30 min, to obtain the composite material. The stirring speed was 250 rpm.

Comparative Example 2

Comparative Example 2 differed from Example 8 in the preparation of hydrophobic coating material in step (b): based on part by mass, 30 parts by mass of hexamethyldisilazane (HMDS), 67 parts by mass of ethanol and 3 parts by mass of hydrophilic silicon dioxide were mixed, and then mechanically stirred for reaction in a 35° C. water bath for 30 min, to obtain the composite material. The stirring speed was 250 rpm.

Performance Test

1. Hydrophobic Performance Test (Contact Angle Test)

A contact angle measuring instrument adopting the image contour analysis method to measure the contact angle of the sample according to the optical imaging principle, was adopted. The contact angle referred to an angle formed between two tangents of gas-liquid interface and solid-liquid interface when liquid phase was sandwiched between the two tangents of gas-liquid interface and solid-liquid interface, and located at the three-phase (solid-liquid-gas) junction point on a solid surface after a drop of liquid was dropped on a horizontal plane of the solid.

Before the test, the contact angle measuring instrument and a computer connected thereto were turned on, and a testing software was operated.

A sample was put on a horizontal table, and the amount of droplet was adjusted with a microliter syringe. The volume of the droplet as generally about 1 µL, and the droplet was formed on the needle. A knob was rotated to move the table up, so that the surface of the sample was in contact with the droplet, and then the table was moved down, so that the droplet can be left on the sample.

The contact angle of the area was obtained by test and data analysis through the testing software. Five different points were taken on the samples in each Example and each Comparative Example to test and get an average value, and then the average value was recorded as the contact angle of the samples in the Example and the Comparative Example. The test results were shown in Table 1 and Table 2.

TABLE 1

| Item | Static contact angle | Environmental protection degree of processing |
|---|---|---|
| Example 1 | >150° | No smell during processing |
| Example 2 | >150° | No smell during processing |

TABLE 1-continued

| Item | Static contact angle | Environmental protection degree of processing |
|---|---|---|
| Example 3 | >150° | No smell during processing |
| Example 4 | >150° | No smell during processing |
| Example 5 | >150° | No smell during processing |
| Example 6 | >150° | No smell during processing |
| Example 7 | >150° | No smell during processing |
| Example 8 | >150° | No smell during processing |
| Comparative Example 1 | >150° | Pungent smell |
| Comparative Example 2 | >150° | Pungent smell |

TABLE 2

| Item | Remark | Static contact angle |
|---|---|---|
| Example 1 (No hydrophobic gaseous silicon dioxide is added) | Dip-coating for 30 min | >150° |
| Example 2 (No hydrophobic gaseous silicon dioxide is added) | Dip-coating for 2 min | >150° |
| Example 3 (Hydrophobic gaseous silicon dioxide is added) | Dip-coating for 30 min | >150° |
| Example 4 (Hydrophobic gaseous silicon dioxide is added) | Dip-coating for 2 min | >150° |

In combination with Table 1, the test results of the above contact angles showed that the initial contact angles of the sample surfaces in Examples 1 to 8 were all greater than 150°, showing a superhydrophobic state, and indicating that the coating layer formed on the plate surface in each embodiment of the present disclosure had relatively excellent hydrophobic performance, which was favorable for promoting the discharge of condensed water in confined space. Although the initial contact angles in Comparative Example 1 and Comparative Example 2 are both greater than 150°, pungent smell was produced by hexamethyldisilazane (HMDS) in the reaction system during the processing of Comparative Example 1 and Comparative Example 2, which was not friendly to the manufacturing personnel.

In combination with Table 2, the static contact angles of the samples in Examples 1 to 4 were all greater than 150°. However, the samples of Example 3 and Example 4 had smaller rolling angles while being observed with the naked eyes, and thus having better superhydrophobic effect. In addition, during the process of dip-coating the plate, there was no significant difference between dip-coating for 2 min and dip-coating for 30 min. Therefore, in practice, the duration of dip-coating can be shortened to improve the efficiency of product preparation and processing.

2. Durability Test 2.1 Flow Test

In this part of the test, samples of Example 3 and Example 7 were taken as examples for flow test. Specifically, the samples in Example 3 and Example 7 were immersed in flowing water, taked out, and dried by blowing at regular intervals, and the contact angles of the sample surfaces and the states of the coating layers were tested. The test results were shown in Table 3, respectively.

TABLE 3

| Item | Flowing water impact resistance test (hour)/Contact angle (°) | | | | |
|---|---|---|---|---|---|
| | 0 | 96 | 168 | 240 | 336 |
| Example 3 (Sandblasted) | >150 | >150 | >150 | >150 | >150 |
| Example 7 (Not sandblasted) | >150 | 120.38 | 102.08 | 89 | |

It can be seen from the data in Table 3 that the contact angle of the surface of the sample in Example 3 was still greater than 150° after 336 h flowing water test, which indicated good hydrophobicity. However, the contact angle of the surface of the coating layer of the sample in Example 7 is about 89° after 240 h flowing water test, which indicated lost hydrophobicity. This indicated that the coating layer of the sandblasted sample according to the present disclosure showed more excellent durability than that of the non-sandblasted sample did.

2.2 Wetting-Drying Cycle Test

In this part of the test, samples of Example 3 and Example 7 were taken as examples for wetting-drying cycle test. The samples of Example 3 and Example 7 were immersed in water, taken out, and dried after a preset time. The contact angles was measured. The above steps were denoted as one cycle. Then, the samples were immersed in water again, and dried after a preset time. The contact angles were measured again, and so on. During the test, the contact angles of the coating layer corresponding to the samples were recorded after part of the number of cycle. The test results were shown in Table 4.

TABLE 4

| Item | Number of wetting-drying cycle/time | |
|---|---|---|
| | 0 | 300 |
| Example 3 (Sandblasted) | >150° | 118.49° |
| Example 7 (Not sandblasted) | >150° | 36.17° |

It can be seen from the data in Table 4 that the contact angle of the surface of the sample of Example 3 was about 118° after a 300 h wetting-drying cycle test, indicating that the hydrophobic performance had decreased to a certain extent, but the coating layer still showed relatively good performance. However, the contact angle of the surface of the coating layer of the sample of Example 7 was about 36° after a 300 h wetting-drying cycle test, indicating lost hydrophobicity. This indicated that the coating layer of the sandblasted sample according to the present disclosure showed more excellent durability than that of the non-sandblasted sample did.

2.3 Hot and Cold Alternating Test

In this part of the test, samples of Example 3 and Example 7 were taken as examples for hot and cold alternating test. The samples in Example 3 and Example 7 were put in a hot and cold alternating box. The temperature ranged from −40° C. to 120° C., and this temperature range was denoted as one cycle. After a certain number of cycles, the samples were taken out and dried by blowing to obtain the contact angles of the coating layer corresponding to the samples. The test results were shown in Table 5.

TABLE 5

| Item | Number of hot and cold alternating/time | | | |
|---|---|---|---|---|
| | 0 | 120 | 240 | 360 |
| Example 3 (Sandblasted) | >150° | >150° | >150° | >150° |
| Example 7 (Not sandblasted) | >150° | >150° | >150° | >150° |

It can be seen from the data in Table 5 that the contact angles of the surfaces of two samples of Example 3 and Example 7 were still greater than 150° after 360 h hot and cold alternating. In the test, the difference between coating layers coated on sandblasted plate and non-sandblasted plate was not very obvious. Therefore, the coating layers of the present disclosure all showed relatively excellent durability in the hot and cold alternating test.

In the description of the present disclosure, referred terms "one embodiment", "some embodiments", "illustrative embodiments", "example", "specific example", or "some examples", etc., means that the specific features, structures, materials or characteristics described in connection with the embodiments or examples are included in at least one embodiment or example of the present disclosure. In the specification, the schematic representations of the above terms do not necessarily refer to the same embodiment or example. Furthermore, the specific features, structures, materials or characteristics described may be combined in a suitable manner in any one or more embodiments or examples. The location words such as "up", "down", "inner" and "outer" described in the embodiments of the present disclosure are described from the angles shown in the drawings, and should not be construed as limitations on the embodiments of the present disclosure.

Although the embodiments of the present disclosure have been shown and described, those skilled in the art can understand that various changes, modifications, substitutions and variants can be made to the embodiments without departing from the principles and purposes of the present disclosure, and the scope of the present disclosure is limited by the claims and their equivalents.

What is claimed is:

1. A heat exchanger, comprising:
a collecting pipe;
a fin;
a heat exchange tube; and
a coating layer,
wherein the heat exchange tube is fixed to the collecting pipe, an inner cavity of the heat exchange tube is communicated with an inner cavity of the collecting pipe, and at least part of the fin is retained between two adjacent heat exchange tubes,
wherein the coating layer is coated on at least part of an outer surface of at least one of the collecting pipe, the heat exchange tube, or the fin,
wherein the coating layer comprises an organosilane-based modified material with low surface energy,
wherein at least one of the collecting pipe, the fin, or the heat exchange tube comprises a metal substrate,
wherein the coating layer comprises a top coating layer and a bottom coating layer, at least part of the bottom coating layer is in contact with the metal substrate, and at least part of the top coating layer is coated on a surface of the bottom coating layer,
wherein the bottom coating layer comprises a compound containing a rare earth element, and wherein the organosilane-based modified material with low surface energy is contained in the top coating layer.

2. The heat exchanger according to claim 1, wherein the coating layer further comprises a hydrophobic filler of nanoparticle type.

3. The heat exchanger according to claim 2, wherein the hydrophobic filler of nanoparticle type comprises hydrophobic gaseous silicon dioxide.

4. The heat exchanger according to claim 1, wherein a static contact angle between the coating layer and water is greater than 150°, and a droplet rolling angle of the coating layer is less than 5°.

5. The heat exchanger according to claim 1, wherein the organosilane-based modified material with low surface energy comprises one or more of 1H,1H,2H,2H-perfluorodecyltriethoxysilane, 1H,1H,2H,2H-perfluorodecyltrimethoxysilane, 1H,1H,2H,2H-perfluorooctyltriethoxysilane, octadecyltrimethoxysilane, and hexadecyltrimethoxysilane.

6. The heat exchanger according to claim 1, wherein the collecting pipe and the heat exchange tube are fixed with each other by brazing,
wherein the heat exchanger comprising a plurality of heat exchange tubes arranged along a length direction of the collecting pipe, a width of each heat exchange tube is greater than a thickness of each heat exchange tube, and a width direction of the plurality of heat exchange tubes and the length direction of the collecting pipe are not co-directional,
wherein the fin is corrugated along a length direction of the plurality of heat exchange tubes,
wherein the fin comprises a plurality of fin units arranged along the length direction of the plurality of heat exchange tubes such that a wave crest or a wave trough in a waveform structure corresponding to the fin is formed at a junction of two adjacent fin units, and
wherein the fin is fixed to the plurality of heat exchange tubes by brazing at the junction of the two adjacent fin units.

7. The heat exchanger according to claim 1, wherein each of heat exchange tubes is provided with a plurality of channels for flowing fluid, the inner cavity of each heat exchange tube comprising the plurality of channels, each of the plurality of channels communicated with the inner cavity of the collecting pipe, and the plurality of channels extending along a same direction.

8. The heat exchanger according to claim 1, wherein the metal substrate comprises an uneven rough surface,
wherein a roughness of the uneven rough surface is defined as Ra,
wherein the roughness satisfies: 0.5 μm≤Ra≤10 μm, and
wherein at least part of the coating layer is coated on the uneven rough surface.

9. A heat exchanger, comprising:
a pair of collecting pipes being spaced from each other, each collecting pipe defining an inner cavity;
a plurality of flat tubes arranged along an axial direction of the pair of collecting pipes, each flat tube comprising two opposite ends retained to a corresponding one of the collecting pipes, the plurality of flat tubes defining a row of micro-channels for refrigerants to flow, the micro-channels disposed along a width direction of the plurality of flat tubes, and the micro-channels in fluid communication with the inner cavity of each of the collecting pipes;
a plurality of fins each being sandwiched between two adjacent flat tubes; and
a coating layer covering an outer surface of at least one of the pair of collecting pipes, the plurality of flat tubes, or the plurality of fins,
wherein the coating layer comprises an organosilane-based modified material with low surface energy,
wherein the outer surface of at least one of the pair of collecting pipes, the plurality of fins, or the plurality of flat tubes comprises a rough surface,
wherein the coating layer comprises a top coating layer and a bottom coating layer, the bottom coating layer is sandwiched between the rough surface and the top coating layer, and
wherein the bottom coating layer comprises a compound containing a rare earth element and the top coating layer comprises the organosilane-based modified material with low surface energy.

10. The heat exchanger as claimed in claim 9, wherein the pair of collecting pipes, the plurality of fins, and the plurality of flat tubes are retained by brazing,
wherein the plurality of flat tubes are arranged along a length direction of the pair of collecting pipes,
wherein a width of each of the plurality of flat tubes is greater than a thickness of each of the plurality of flat tubes, and
wherein a width direction of the plurality of flat tubes is perpendicular to the length direction of the pair of collecting pipes.

11. The heat exchanger as claimed in claim 9, wherein each of the plurality of fins is a corrugated fin extending along a length direction of the plurality of flat tubes, and each fin comprises a wave crest and a wave trough connecting with two side walls of two adjacent flat tubes, respectively.

12. The heat exchanger as claimed in claim 9, wherein the rough surface is formed by sandblasting,
wherein a roughness of the rough surface is defined as Ra, Ra satisfying: 0.5 μm≤Ra≤10 μm, and
wherein the coating layer is at least partially coated on the rough surface.

* * * * *